US011983483B2

(12) United States Patent
Glocke et al.

(10) Patent No.: US 11,983,483 B2
(45) Date of Patent: May 14, 2024

(54) WEB SITE PREVIEW GENERATION WITH ACTION CONTROL

(71) Applicant: Microsoft Technology Licensing, LLC, Redmond, WA (US)

(72) Inventors: Joseph Michael Glocke, Seattle, WA (US); Archana Saseetharan, Sammamish, WA (US); Bhrighu Sareen, Kirkland, WA (US); Sukhmani Lamba, Bellevue, WA (US); Ankit Govil, Redmond, WA (US); David Pierre Claux, Redmond, WA (US); Saurav Majumder, Lynnwood, WA (US); Mao Yu, Bellevue, WA (US); Daniel Dong Joon Seong, Bellevue, WA (US); Aditya Chaudhry, Newcastle, WA (US); Nehal Balkrishna Bhagat, Vancouver (CA); Rahul Kishore Pinjani, Bellevue, WA (US); Mengli Elmendorf, Montgomery, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/752,665

(22) Filed: May 24, 2022

(65) Prior Publication Data
US 2023/0385525 A1    Nov. 30, 2023

(51) Int. Cl.
*G06F 40/106* (2020.01)
*G06F 16/955* (2019.01)
(Continued)

(52) U.S. Cl.
CPC .......... *G06F 40/106* (2020.01); *G06F 16/955* (2019.01); *G06F 16/9574* (2019.01); *G06F 40/14* (2020.01); *G06F 40/186* (2020.01)

(58) Field of Classification Search
CPC ...... G06F 40/106; G06F 40/186; G06F 40/14; G06F 16/9574; G06F 16/955
See application file for complete search history.

(56) References Cited

U.S. PATENT DOCUMENTS 5,708,825 A * 1/1998 Sotomayor ............. G06F 40/30
707/E17.094
5,890,172 A * 3/1999 Borman ................ H04L 67/565
715/205
(Continued)

FOREIGN PATENT DOCUMENTS

CN       103425794 A    12/2013
CN       108628870 A    10/2018
WO   WO-2010129088 A1 * 11/2010   ........... G06Q 10/107

OTHER PUBLICATIONS

"App Clips", Retrieved from: https://web.archive.org/web/20220325114934/https://developer.apple.com/app-clips/, Mar. 25, 2022, 4 Pages.

(Continued)

*Primary Examiner* — Shahid K Khan
(74) *Attorney, Agent, or Firm* — Workman Nydegger

(57) ABSTRACT

The automated generation of a web site preview based on a web site identifier, where the web site preview has one or more controls that facilitate connection to one or more endpoints. In response to receiving the web site identifier from the client computing system, the service uses the web site identifier to navigate to the web site identified by the web site identifier. After navigating to that web site, the service accesses an action identifier and an associated endpoint identifier from the web site. The service then generates preview data representing a preview of the web site represented by the web site identifier. The service provides the preview data to the client, where the preview with the (Continued)

control is rendered, so as to facilitate connection with the associated endpoint of the control.

19 Claims, 10 Drawing Sheets

(51) Int. Cl.
*G06F 16/957* (2019.01)
*G06F 40/14* (2020.01)
*G06F 40/186* (2020.01)

(56) References Cited

U.S. PATENT DOCUMENTS

| | | | |
|---|---|---|---|
| 7,031,968 B2 | 4/2006 | Kremer et al. | |
| 7,159,188 B2* | 1/2007 | Stabb | G06F 3/04855 715/838 |
| 7,174,513 B1* | 2/2007 | Nickum | G06F 16/9574 715/838 |
| 7,383,248 B2* | 6/2008 | Chen | G06F 16/9535 707/E17.115 |
| 7,765,206 B2* | 7/2010 | Hillis | G06Q 50/10 707/723 |
| 7,814,425 B1* | 10/2010 | O'Shaugnessy | G06F 3/04842 715/752 |
| 8,903,931 B1* | 12/2014 | Rothman | G06F 40/106 705/14.35 |
| 8,949,370 B1 | 2/2015 | Wu et al. | |
| 9,542,365 B1* | 1/2017 | Rothman | H04L 51/18 |
| 9,973,462 B1* | 5/2018 | Petersen | H04L 51/214 |
| 10,621,272 B1* | 4/2020 | Rose | H04L 51/23 |
| 2002/0073058 A1* | 6/2002 | Kremer | G06Q 30/02 |
| 2002/0129114 A1* | 9/2002 | Sundaresan | H04L 67/568 709/213 |
| 2003/0014415 A1 | 1/2003 | Weiss et al. | |
| 2004/0003351 A1* | 1/2004 | Sommerer | G06F 16/955 715/251 |
| 2004/0205514 A1* | 10/2004 | Sommerer | G06F 40/106 715/205 |
| 2004/0267701 A1* | 12/2004 | Horvitz | G06F 16/34 707/E17.093 |
| 2004/0268231 A1 | 12/2004 | Tunning | |
| 2005/0022128 A1* | 1/2005 | Nicholas | G06F 40/106 715/788 |
| 2005/0235203 A1* | 10/2005 | Undasan | G06F 40/134 715/205 |
| 2005/0246643 A1* | 11/2005 | Gusmorino | G06F 16/9577 715/734 |
| 2006/0069617 A1* | 3/2006 | Milener | G06Q 20/145 705/14.69 |
| 2006/0101068 A1 | 5/2006 | Stuhec et al. | |
| 2007/0038718 A1* | 2/2007 | Khoo | H04L 51/046 709/206 |
| 2007/0180381 A1* | 8/2007 | Rice | G06F 16/9577 715/838 |
| 2008/0162529 A1 | 7/2008 | Stuhec | |
| 2009/0228804 A1 | 9/2009 | Kim et al. | |
| 2010/0120456 A1* | 5/2010 | Karmarkar | H04W 4/02 715/752 |
| 2010/0312641 A1* | 12/2010 | Zaibert | G06Q 30/0253 705/14.51 |
| 2011/0145698 A1* | 6/2011 | Penov | G06F 40/221 709/206 |
| 2011/0173569 A1* | 7/2011 | Howes | G06F 16/9574 707/707 |
| 2011/0242601 A1* | 10/2011 | Takahashi | G06F 3/1205 358/1.15 |
| 2012/0150989 A1* | 6/2012 | Portnoy | G06F 16/9566 709/217 |
| 2012/0203929 A1* | 8/2012 | Patalsky | G06F 16/9566 709/245 |
| 2012/0328259 A1* | 12/2012 | Seibert, Jr. | G06F 40/106 386/230 |
| 2013/0151936 A1 | 6/2013 | Hsu et al. | |
| 2013/0159445 A1 | 6/2013 | Zonka et al. | |
| 2013/0262986 A1 | 10/2013 | Leblond et al. | |
| 2014/0040226 A1 | 2/2014 | Sadhukha | |
| 2014/0040770 A1* | 2/2014 | Khoo | G06Q 10/107 715/752 |
| 2014/0108408 A1* | 4/2014 | Edgar | G06F 16/9535 707/738 |
| 2014/0136942 A1* | 5/2014 | Kumar | G06F 40/106 715/229 |
| 2014/0245176 A1* | 8/2014 | Murali | H04L 51/42 715/752 |
| 2014/0247278 A1* | 9/2014 | Samara | G06T 11/00 345/633 |
| 2015/0026201 A1 | 1/2015 | Mukherjee et al. | |
| 2015/0073922 A1* | 3/2015 | Epperson | G06Q 30/0277 705/14.73 |
| 2015/0220499 A1* | 8/2015 | Katic | G06F 40/106 715/207 |
| 2015/0236979 A1* | 8/2015 | Kirillov | H04L 67/53 709/226 |
| 2015/0347532 A1* | 12/2015 | Shaw | G06F 3/0484 707/722 |
| 2016/0092245 A1* | 3/2016 | Hogue | G06F 9/453 715/711 |
| 2016/0092428 A1* | 3/2016 | Ilic | G06F 3/04847 715/765 |
| 2016/0103861 A1* | 4/2016 | Jacob | G06F 16/958 707/711 |
| 2016/0180257 A1* | 6/2016 | Rees | G06Q 10/02 705/5 |
| 2016/0234267 A1 | 8/2016 | Hebbar | |
| 2016/0323217 A1* | 11/2016 | Subramani | G06F 40/274 |
| 2016/0334979 A1* | 11/2016 | Persson | H04L 51/214 |
| 2017/0052943 A1* | 2/2017 | Owens | G06F 40/143 |
| 2017/0097808 A1* | 4/2017 | Masterson | G06F 3/04845 |
| 2017/0111431 A1* | 4/2017 | Scoda | G06F 40/186 |
| 2017/0111467 A1 | 4/2017 | Zhang et al. | |
| 2018/0033064 A1* | 2/2018 | Varley | G06F 16/5866 |
| 2018/0095604 A1* | 4/2018 | Nguyen | G06F 40/186 |
| 2018/0260481 A1 | 9/2018 | Rathod | |
| 2018/0300217 A1 | 10/2018 | Doggett et al. | |
| 2019/0102472 A1* | 4/2019 | Van Rensburg | G06Q 10/101 |
| 2019/0147178 A1* | 5/2019 | Baldwin | H04L 51/52 726/28 |
| 2020/0272669 A1* | 8/2020 | Ebbesen | G06F 16/9538 |
| 2020/0311135 A1* | 10/2020 | Kligman | G06F 16/972 |
| 2020/0344188 A1* | 10/2020 | Raskin | G06F 3/0486 |
| 2020/0351314 A1* | 11/2020 | Butcher | H04L 65/4025 |
| 2021/0034690 A1* | 2/2021 | Kim | G06F 16/906 |
| 2021/0065254 A1* | 3/2021 | Zheng | G06Q 30/0255 |
| 2023/0385363 A1 | 11/2023 | Glocke et al. | |
| 2023/0385524 A1 | 11/2023 | Glocke et al. | |

OTHER PUBLICATIONS

"The Verge", Retrieved from: https://www.theverge.com/, Mar. 30, 2022, 2 Pages.

Chen, et al., "Teams website tabs leads to customer confusion", Retrieved from: https://docs.microsoft.com/en-us/microsoftteams/troubleshoot/tabs/website-tabs-cause-confusion-teams, Mar. 8, 2022, 2 Pages.

"International Search Report and Written Opinion Issued in PCT Application No. PCT/US23/014199", dated Jun. 6, 2023, 13 Pages.

"International Search Report and Written Opinion Issued in PCT Application No. PCT/US23/014201", dated Jun. 12, 2023, 14 Pages.

"International Search Report and Written Opinion Issued in PCT Application No. PCT/US23/014209", dated Jun. 19, 2023, 14 Pages.

"Non Final Office Action issued in U.S. Appl. No. 17/752,658", dated Mar. 15, 2023, 19 Pages.

"Non Final Office Action Issued in U.S. Appl. No. 17/752,675", dated Feb. 16, 2023, 15 Pages.

"Final Office Action Issued in U.S. Appl. No. 17/752,675", Mailed Date: Aug. 22, 2023, 18 Pages.

(56) References Cited

OTHER PUBLICATIONS

"Final Office Action Issued in U.S. Appl. No. 17/752,658", Mailed Date: Aug. 11, 2023, 26 Pages.
"Getting Started with Schema.org Using Microdata", Retrieved From: https://web.archive.org/web/20220523200400/https://schema.org/docs/gs.html, Retrieved Date: May 23, 2022, 5 Pages.
"Non Final Office Action issued in U.S. Appl. No. 17/752,675"; Mailed Date: Dec. 7, 2023, 22 Pages.
Notice of Allowance mailed on Dec. 12, 2023, in U.S. Appl. No. 17/752,658, 12 pages.
Notice of Allowance mailed on Dec. 22, 2023, in U.S. Appl. No. 17/752,658, 2 pages.
U.S. Appl. No. 17/752,658, filed May 24, 2022.
U.S. Appl. No. 17/752,675, filed May 24, 2022.
Notice of Allowance mailed on Mar. 5, 2024, in U.S. Appl. No. 17/752,658, 2 pages.

* cited by examiner

_400A_

1:15 PM

Hey Carol – you can track your client's arrival here: Flight Schedules: ABC Airlines

Flight Status
ARRIVED ←—_401A_

Passengers　　　　　　　　　　　　　　　Seat
John Doe　　　　　　　　　　　　　　　　　14A
Jane Doe　　　　　　　　　　　　　　　　　14B
Tommy Doe　　　　　　　　　　　　　　　　14C

Flight　　　　　　Departs　　　　　　Arrives
AB613　　　　　　　2:20 AM　　　　　　　8:20 PM

Amsterdam Airport　　　　　　　San Francisco Airport
AMS  SFO

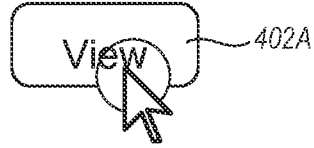

Hey, can you look at this change?
www.abccodereviewservice.com/issue12345678

Code Service

Change string in the leader • Issue #3
　Master | MERGED | 4/3/2019

Please update our strings to match the latest branding standards
　Comment　　　　　Close Issue　　　　　Button

*FIG. 4B*

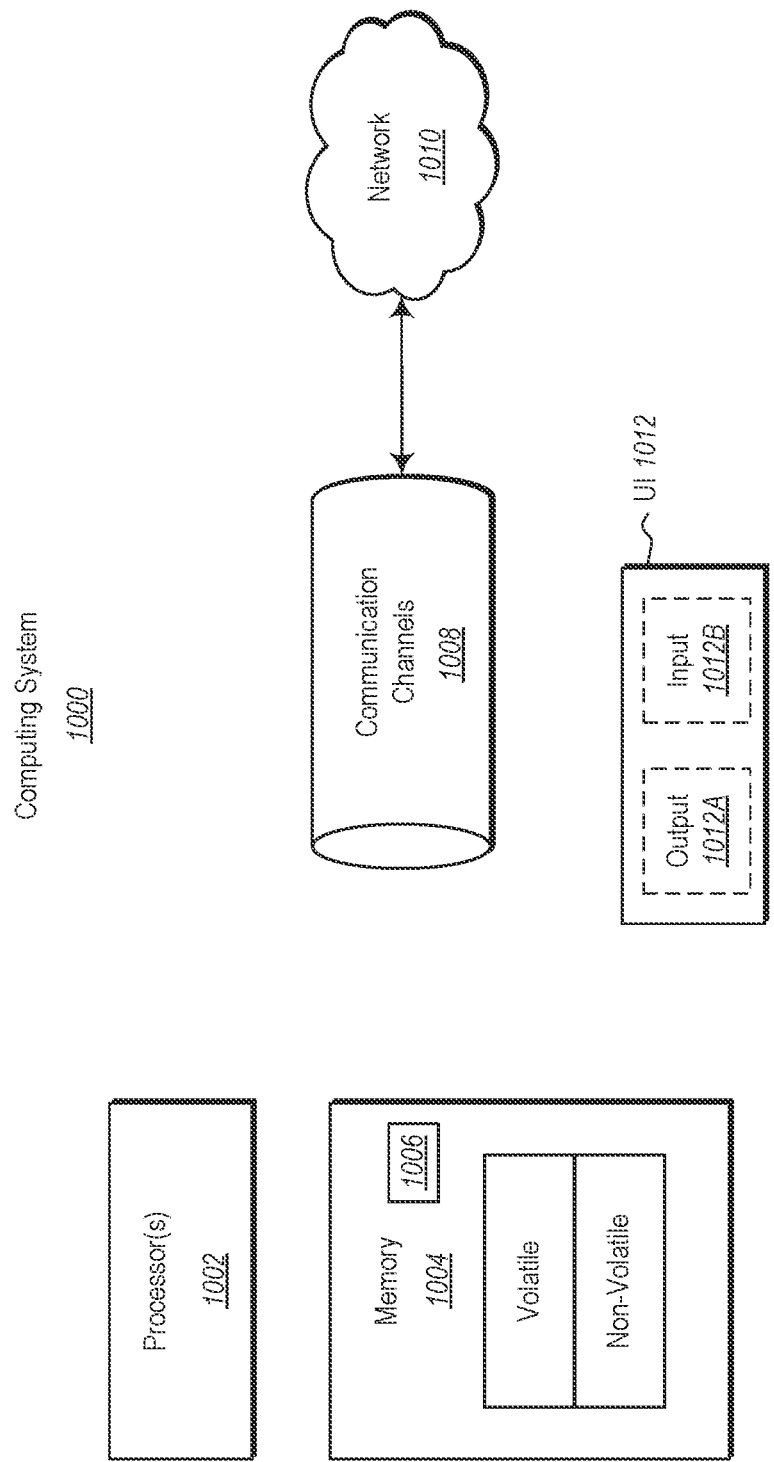

WEB SITE PREVIEW GENERATION WITH ACTION CONTROL

BACKGROUND

A Uniform Resource Locator (or URL) is a text string identifier that uniquely identifies a resource on the web. As an example, URLs can identify web sites. URLs of web sites are commonly input into a web browser to cause the browser to navigate to the respective web site. In addition, URLs are often associated with selectable links (often called "hyperlinks") within a web site. Selection of a hyperlink causes the browser to navigate to the web site identified by the URL associated with the hyperlink.

URLs can be used in other ways as well. For example, a URL can be input into a chat window, which can potentially cause the system to render a limited preview of the web site. As an example, the preview might include an image, limited text, and perhaps a hyperlink that, when selected, allows for navigation to the web site associated with the link. This gives the user a better idea of what the web site offers as compared to simply presenting only the text of the URL. Thus, the user knows a little more about the web site to allow the user to make a more informed decision on whether to select the hyperlink. Once the user selects the hyperlink and has navigated to the web site, the user can then navigate through the web site (e.g., by selecting hyperlinks or controls) to perform various actions while at the web site.

As an example, the user might navigate to a web site that offers products for sale, and then thereafter perform actions to purchase a product. As another example, the user might navigate to a web site that is promoting an event, and thereafter select hyperlinks or controls to find out more about the event, buy tickets for the event, or find out where on a map the event is. As yet another example, the user might navigate to a restaurant web site, and thereafter view a menu, or make reservations.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The principles described herein relate to the automated generation of a web site preview based on a web site identifier, where the web site preview has one or more controls that facilitate connection to one or more endpoints. In response to receiving the web site identifier from the client computing system, the service uses the web site identifier to navigate to the web site identified by the web site identifier. After navigating to that web site, the service accesses an action identifier and an associated endpoint identifier from the web site. The service then generates preview data representing a preview of the web site represented by the web site identifier.

That preview data is structured to be interpreted by the client computing system to cause the client computing system to render a web site preview. That preview data is further structured to cause the client computing system to render the web site preview with an action control associated with an action and that facilitates connection to the endpoint identified by the endpoint identifier. The service then causes the preview data to be sent to the client computing system, which can then interpret the preview data to render the web site preview with the action control.

Thus, the web site preview may provide one or more controls that may be directly interacted with from the web site preview itself, in order to allow the user to take direct action via the web site preview, or view updates in data from the associated endpoint. Thus, key actions may be more efficiently performed by the user staying within the context in which the preview was presented, and without the user having to navigate to the web site that is previewed.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which:

FIG. 4A illustrates an example web site preview of an airline web site that has controls that update to reflect new flight status, and that includes a control with an associated flight tracker endpoint;

FIG. 4B illustrates an example code review web site preview that has a number of controls about a code review issue;

FIG. 10 illustrates an example computing system in which the principles described herein may be employed.

DETAILED DESCRIPTION

The principles described herein relate to the automated generation of a web site preview based on a web site identifier, where the web site preview has one or more controls that facilitate connection to one or more endpoints. In response to receiving the web site identifier from the client computing system, the service uses the web site identifier to navigate to the web site identified by the web site identifier. After navigating to that web site, the service accesses an action identifier and an associated endpoint identifier from the web site. The service then generates preview data representing a preview of the web site represented by the web site identifier.

That preview data is structured to be interpreted by the client computing system to cause the client computing system to render a web site preview. That preview data is further structured to cause the client computing system to render the web site preview with an action control associated with an action and that facilitates connection to the endpoint identified by the endpoint identifier. The service then causes the preview data to be sent to the client computing system, which can then interpret the preview data to render the web site preview with the action control.

Thus, the web site preview may provide one or more controls that may be directly interacted with from the web site preview itself, in order to allow the user to take direct action via the web site preview, or view updates in data from the associated endpoint. Thus, key actions may be more efficiently performed by the user staying within the context in which the preview was presented, and without the user having to navigate to the web site that is previewed.

Figure 1:
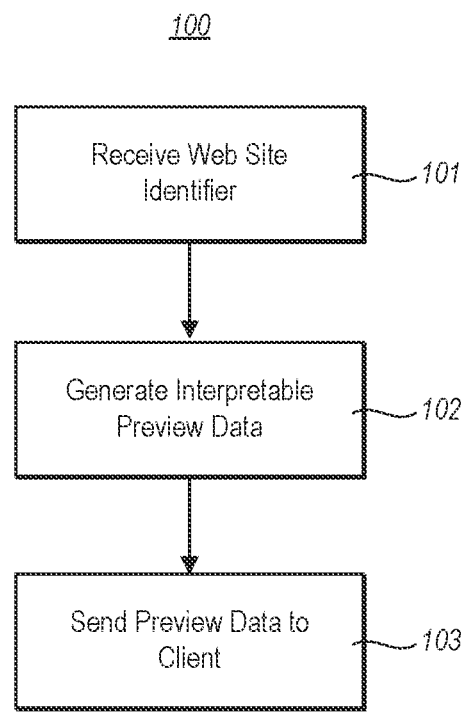
FIG. 1 illustrates a flowchart of a method for generating a web site preview based on a web site identifier, in accordance with the principles described herein.
Figure 2:
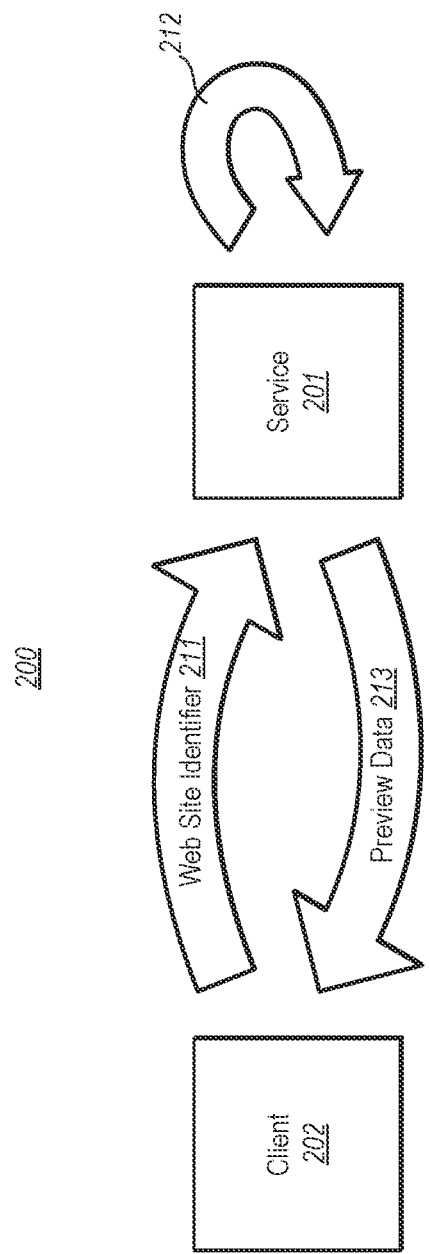
FIG. 2 illustrates a network environment that includes a client computing system and a preview service computing system, which represents an example environment in which the method of FIG. 1 may be performed.

FIG. 1 illustrates a flowchart of a method 100 for generating a web site preview based on a web site identifier, in accordance with the principles described herein. As an example only, the web site identifier may be a Uniform Resource Locator (or URL). FIG. 2 illustrates a network environment 200 which represents an example of an environment in which the principles described herein may operate, and represents an example environment in which method 100 may be performed. Accordingly, the method 100 of FIG. 1 will be described with reference to FIG. 1 as well as with reference to the network environment 200 of FIG. 2.

The method 100 may be performed by a service computing system and is initiated upon that service computing system receiving a web site identifier from a client computing system (act 101). Referring to FIG. 2, the network environment 200 includes a service computing system 201 and a client computing system 202. Each of the computing systems 201 and 202 may be structured as described below for the computing system 1000 of FIG. 10. In one example of the act 101, the service computing system 201 receives (as represented by arrow 211) a web site identifier from the client computing system 202.

In response to receiving the web site identifier from the client computing system (act 101), the service computing system generates preview data representing a preview of a web site represented by the web site identifier (act 102). In FIG. 2, the generation of the preview data based on the web site identifier is represented by the circular arrow 212. The preview data is structured to be interpreted by the client computing system to cause the client computing system to render a web site preview. In some embodiments, the web site preview is defined by the preview data. Thus, by appropriately generating the preview data, the service computing system controls how the web site preview is rendered by the client computing system.

In accordance with the method 100, after the preview data is generated (act 102), the service computing system then causes the generated preview data to be sent to the client computing system (act 103). As an example, in FIG. 2, the service computing system 201 sends (as represented by the arrow 213) the preview data to the client computing system 202. At the client computing system, the preview data may then be interpreted to render the web site preview. Thus, the user is provided a web site preview associated with a web site identifier.

Typically, when a web site preview is presented to a user, the preview may act as a hyperlink (or otherwise contain a hyperlink) that when selected, navigates the user to the web site that was previewed by the web site preview. Then, the user can interact with the web site as normal including interacting with any controls provided by the web site. However, in accordance with some embodiments of the principles described herein, one or more controls of the web site are provided within the web site preview itself. Thus, a user can use those controls without even navigating to the web site.

Figure 3:
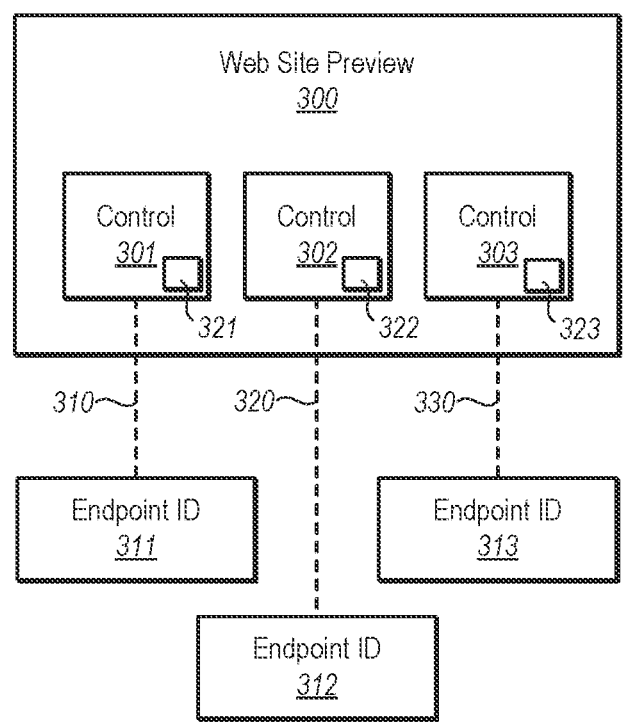
FIG. 3 illustrates a general example of a web site preview that includes three controls, each with an associated endpoint identifier that facilitates connection to an associated endpoints with respect to interactivity with the control.

For illustrative purposes only, FIG. 3 illustrates a general example of a web site preview 300 that includes three controls 301, 302 and 303, each with associated endpoints identifiers 311, 312 and 313. The endpoint identifiers can be any identifier that the client computing system can use to further connection to the endpoint identified by the associated endpoint identifier. In one example, such endpoint identifiers are also URLs. The web site preview may include other web site content as well, such as images, text (e.g., descriptions, summaries, titles), and others, although this other content is not represented in FIG. 3 in order to allow for focus on the controls themselves. FIG. 3 is just an example. The principles described herein are not limited to the number of action controls within a web site preview.

As represented by dashed lines 310, 320 and 330, each control is associated with endpoint identifiers 311, 312 and 313 respectively. The controls also have corresponding configurations 321, 322 and 323 that define the type of connection that is facilitated by the respective control. Thus, the control 301 facilitates a specific type of connection defined by the configuration 321 to the endpoint identified by the endpoint identifier 311. Furthermore, in this example, the control 302 facilitates a specific type of connection defined by the configuration 322 to the endpoint identified by the endpoint identifier 312. Lastly in this example, the control 303 facilitates a specific type of connection defined by the configuration 323 to the endpoint identified by the endpoint identifier 313.

One example of a connection type is a navigation connection type in which the client computing system is navigated to the endpoint in response to its user interacting with the control. Such a control will be referred to herein as a "navigation control". Another example of a connection type is an input connection type in which the user can provide input (e.g., text, a Boolean, a selection from a group, or the like) to the connected endpoint. Such a control will be referred to herein as an "input control". Another example of a connection type is an output connection in which the endpoint provides data to populate into the control, and perhaps even update that data. Such a control will be referred to herein as an "output control".

These are just three different examples of a connection type and associated control type. The principles described herein apply regardless of the type of connection that the control facilitates. Furthermore, the principles described herein apply regardless of the form of the control, regardless of layout, design, color, size, shape, user interactivity types, and so forth.

Examples of navigation controls will now be described. For instance, if the web site is a restaurant web site, an example navigation control could be a description control, that when interacted with, takes the user to a description endpoint maintained by the restaurant that is perhaps managed by the restaurant. As another example, there may also be a navigation control in the form of a menu control that when interacted with, takes the user to a menu endpoint maintained by the restaurant that presents a menu of the restaurant. These endpoints may for instance be within the domain of the web site that is being previewed (in this case, the restaurant web site).

However, there may also be controls with endpoints that are completely outside of the domain of the restaurant web site. As examples, there may be a navigation control to make a reservation for the restaurant, which when interacted with takes the user to a reservation service endpoint that is not managed by the restaurant web site. As another example, the restaurant web site preview may provide a navigation control to provide a map to see where the restaurant is and/or get directions to the restaurant, which when interacted with takes the user to a mapping service endpoint that is also not managed by the restaurant web site. The same web site preview may provide a navigations control that when interacted with takes a user to a review service that is also not managed by the restaurant web site. Thus, the controls may provide functionalities that link to services that are familiar to the user, and thus are easily and comfortably navigated. Furthermore, the web site that has the preview need not themselves provide the services that underlie each control in the preview. Instead, the controls may link to endpoints that are outside of the domain of the web site.

As an example of an input control, there may be an input control that allows the user to add their name to a waitlist, which when interacted with provides a user identifier to the endpoint that registers those waiting for a table. As an example of an output control, the restaurant may generate an output control that shows wait time, which updates to reflect a time estimate for minutes remaining until their table is available. As another example of an output control this time in the context of an airline web site, the output control may update to reflect the real-time status of a flight (e.g., on time, in flight, delayed, landed, and so forth) of a flight. There might be another control that may be interacted with to connect to a flight tracker service, to thereby present the user with a flight tracking update.

FIG. 4A illustrates a text chat window 400A in which a user has sent a chat to Carol (a fictional person) and pasted a web site identifier that results in a preview being rendered within the chat window. The preview includes various static information including the names of passengers, the route, and flight number. However, there is an output control 401A that shows status 401A that can be updated as the flight progresses. Furthermore, the departure time and arrival time may also be in distinct output control that are updated. The preview also includes a navigation control 402A that may be selected from this preview itself to obtain flight tracking information from a separate flight tracking service.

As another example user interaction, FIG. 4B illustrates an example code review preview 400B for a fictional code review service for a fictional code review issue. Here, there are several controls that a user can interact with directly in order to comment, close the issue, and so forth. Thus, the user can actually take action on the code issue directly from the preview itself, and without having to navigate to the code review service.

Figure 5:
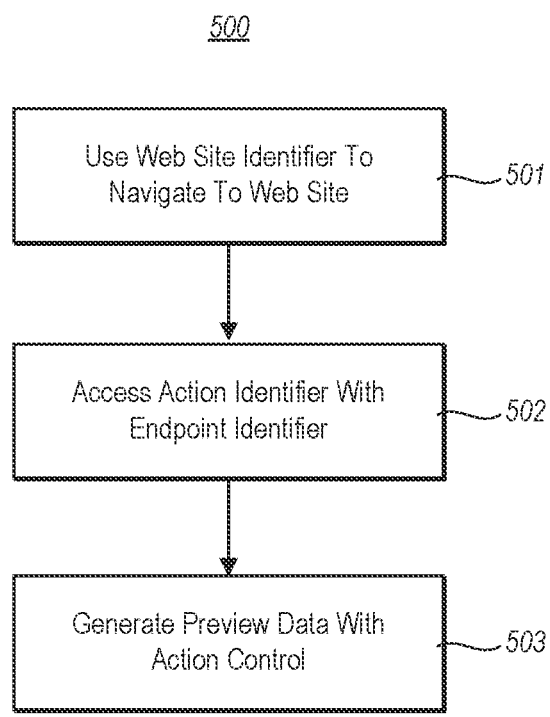
FIG. 5 illustrates a flowchart of a method for generating a preview of the web site identified by the web site identifier so as to have one or more controls, in accordance with one embodiment described herein.
Figure 6:
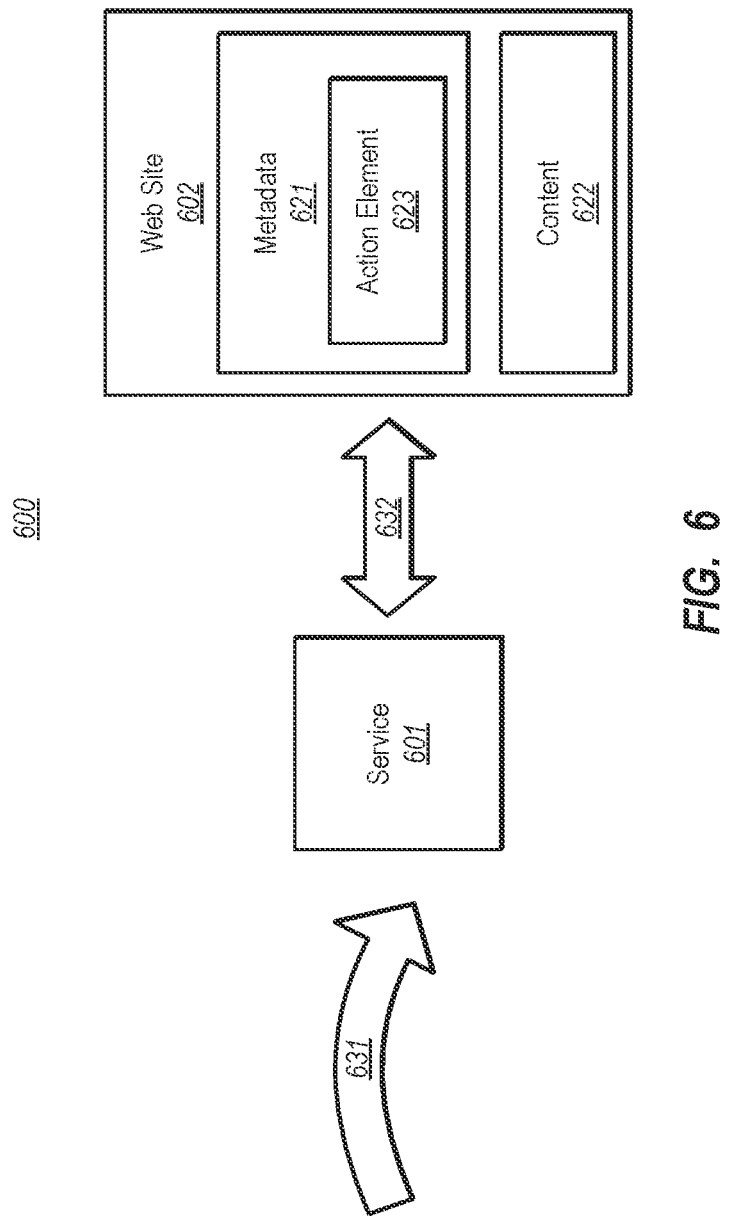
FIG. 6 illustrates a data flow that may be executed using the method of FIG. 4.

FIG. 5 illustrates a flowchart of a method 500 for generating preview data, which represents an example of the act 102 of FIG. 1. Since act 101 has already occurred, the service computing system already has the web site identifier prior to the method 500 beginning. FIG. 6 illustrates an example environment 600 in which the method 500 may be performed. The environment 600 includes a service computing system 601 and a web site 602. The service computing system 601 has received (as represented by arrow 631) a web site identifier from a client computing system. The service computing system 601 is an example of the service computing system 201 of FIG. 2. The method 500 of FIG. 6 will now be described with respect to the environment 600 of FIG. 6.

In accordance with the method 500, the service computing system uses the received web site identifier to navigate to the web site identified by the web site identifier (act 501). In FIG. 6, the service computing system 601 navigates to the web site 602. If the web site identifier was a URL, then the service could simply use standard web navigation to navigate to the web site.

After navigating to the web site (act 501), the service computing system accesses an action identifier and an associated endpoint identifier from the web site (act 502). In FIG. 6, the web site 602 includes metadata 621 and content 622. The metadata 621 includes an action element 623 which includes information that the web site 602 itself would use to provide an action control in the context of the web site 602. The service computing system accesses information from the action element to put that control within the preview data itself. Such information could include the name of the action, the endpoint identifier for the action, the configuration of the action, and so forth. The interactivity used to obtain this action identifier and associated endpoint identifier is represented by the bi-directional arrow 632.

The preview data is then generated to be structured to be interpreted by the client computing system to cause the client computing system to render the web site preview with an action control associated with an action and that facilitates connection to the endpoint identified by the endpoint identifier (act 503). As an example, the service computing system may generate data interchange format (such as for example JSON) is placed within the preview data, which may also be in a data interchange format. Although not required, subsequent description will discuss how the generation of the preview data may be accomplished with preview templates.

Figure 7:
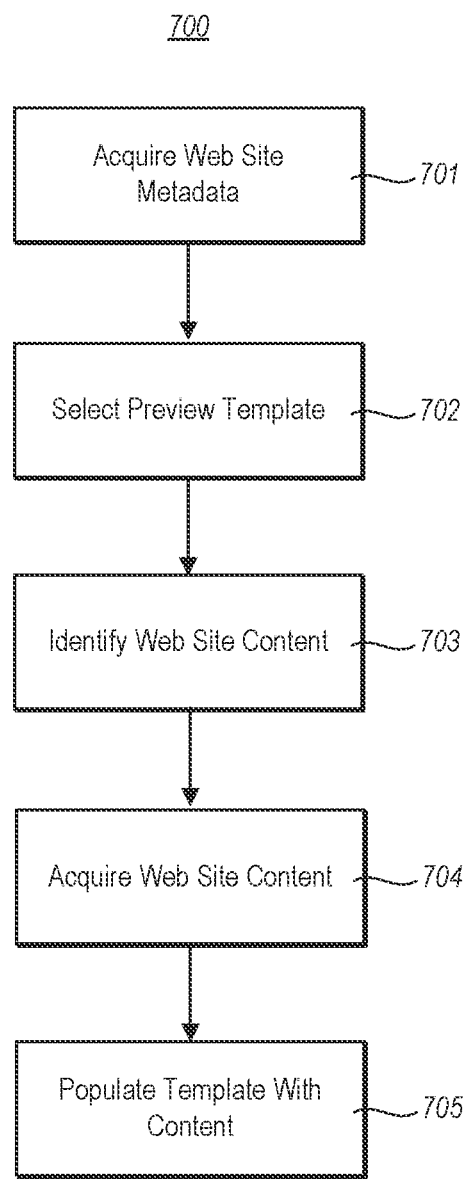
FIG. 7 illustrates a flowchart of a method for generating a preview of the web site identified by the web site identifier by using templates, in accordance with one embodiment described herein.

FIG. 7 illustrates a flowchart of a method 700 for generating a preview of the web site identified by the web site identifier. The method 700 represents a more specific example of how the act 102 of FIG. 1 may be performed. In this method 700, metadata from the web site is used to select an appropriate template, and then that template is populated. In accordance with the method 700, the service computing system acquires web site metadata from the web site (act 701). As an example, the web site metadata may conform with schema.org or another schema defining entity. Such metadata might include, for example, a type of the web site (e.g., event, product, restaurant, airline, and so forth), a web site provider entity name, or any other information that is relevant in selecting an appropriate preview template.

The preview service uses the metadata acquired from the web site in order to select an appropriate preview template (act 702). The fields within the template define what content of the web site is to be used to populate the template. This includes what action controls to populate into the template, and where. Accordingly, the service uses the template to determine what content to populate into the template (act 703). The preview service may then acquire the appropriate content of the web site (act 704) and populates that content into the template (act 705). Such content may include, for instance, action data that is structured to be interpretable by the client computing system to cause the client computing system to render the control within the preview.

Figure 8:
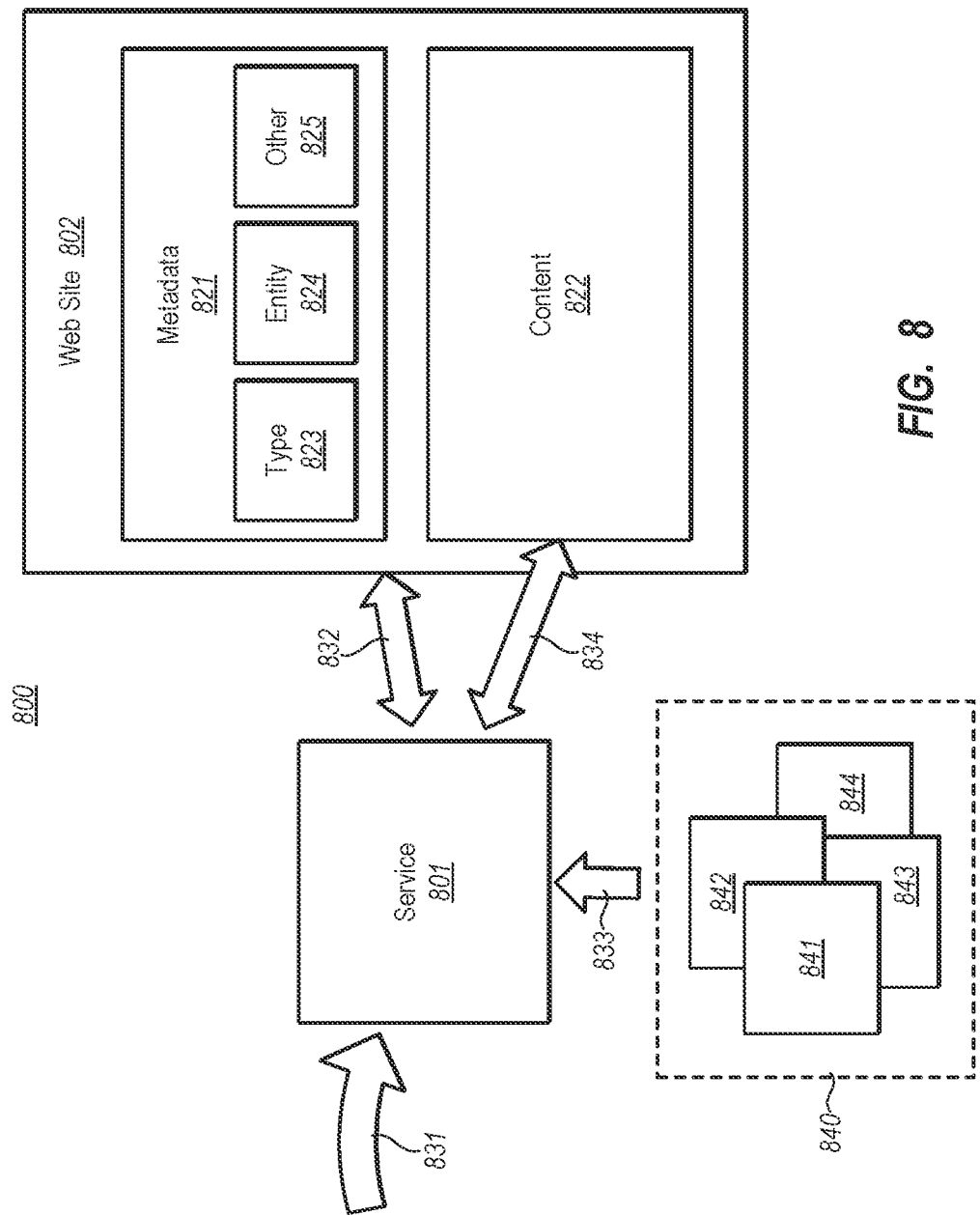
FIG. 8 illustrates a data flow that may be executed using the method of FIG. 7.

FIG. 8 illustrates a data flow 800 that may be executed using the method 700 of FIG. 7. The data flow 800 includes receipt of a web site identifier by a service computing system 810. Such receipt is represented by arrow 831. The service computing system then accesses the web site 802 associated with the identifier. That web site 802 includes metadata 821 and content 822. The metadata 821 could include a type 823 of the web site, perhaps an entity 824 that provides the web site, and potentially other information 825. Such may be structured in accordance with a schema specified within the web site. For instance, the schema might be a version of a schema provided by schema.org.

The service computing system acquires (e.g., reads) at least some of the metadata 821 of the website (as an example of act 701). The service computing system finds the web site using the web site URL provided by the client. This service acquiring such metadata is represented by bi-directional arrow 832 in FIG. 8.

The service uses the metadata to select a preview template (as an example of act 702). For example, the service computing system 801 may have access to a preview template collection 840. In this example, the collection 840 has four preview templates 841 through 844, but this is just a simple example only. There may be countless preview templates available to the service computing system 801. In this example, suppose that the service selects preview template 842, which selection is represented by arrow 833.

The service then uses the template 842 to determine what web site content to populate into the template (as an example of act 703), acquires that content from the web site (as an example of act 704) as represented by bi-directional arrow 834, and populates that content into the web site template (as an example of act 705). The populated preview template may then serve is the generated preview data that is then sent to the client. This preview data may be for example, a data interchange format object, such as a JSON object, which is a sequence of declarations that defines how to render the web site preview. The client may then interpret the preview data to thereby render the web site preview. Although the arrows 832 and 834 are shown separately, all information (metadata and content) required to generate the preview may be acquired from the web site 502 from a single request and response.

Figure 9:
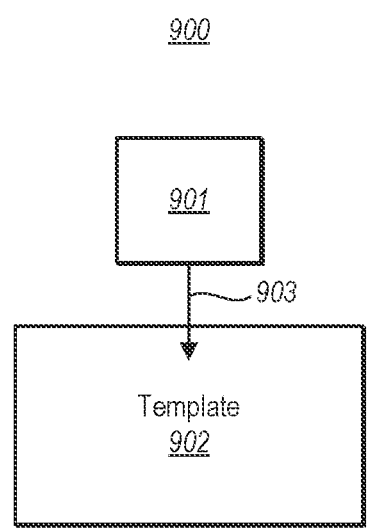
FIG. 9 illustrates a data flow in which some web site content is populated into a copy of the selected preview template, which in one example generates the preview data that is returned to the client.

FIG. 9 illustrates a data flow 900 in which some web site content 901 is populated (as represented by arrow 903) into a copy of the selected template 902, which in one example generates the preview data that is returned to the client. In another embodiment, the preview data sent to the client includes the web site content 902 and the unpopulated template 901 (perhaps as a single JSON object or multiple JSON object). The client would then populate the appropriate portion of the content 902 into the unpopulated template 901 as part of rendering the preview data. This has a disadvantage in that it relies upon the client having the capability to perform binding of content 902 into the template 901, which not all clients may have. On the other hand, rendering declarative sequences (such as JSON objects) is a much more universal operation that client computing systems are typically capable of doing. This is an advantage of providing the preview data as an already populated copy of the template.

As described above, the template is selected at least in part based on the web site metadata. As an example, the web site metadata may include a type of web site. For example, a product web site (of type "product") may by default result in the selection of a product web site preview, a restaurant web site (of type "restaurant") may by default result in selection of a restaurant web site preview, an airline web site (of type "airline") may by default result in selection of an airline web site. Such selection does not rely on any input by the web site owner itself. Instead, the selection merely by default pivots on the value of the type field in the web site metadata.

Thus, the user has a consistent preview across all product web site previews, across all restaurant web site previews, and so forth, where those web site previews are tailored towards the type of web site. The user is thereby given an intuitive web site preview. Such web site previews may be generated with the aim of providing a robust and rich experience for the user that views and/or interfaces with the web site preview, and may consider input from other stakeholders. Because the service controls how the web site preview appears, rather than have such control left to each client, the user is provided with a much more consistent user experience. Furthermore, because the service computing system is a service that may operate in a cloud computing environment that has abundant processing, memory and storage resources, the generation of the preview may consider a variety of factors and be the result of complex processing, thereby providing a more substantial web site preview.

Alternatively, or in addition, relevant metadata used to select the preview template may be the entity expressed in the metadata of the web site. This is the provider of the web site. In one embodiment, that entity can register a particular preview template with the preview service. Thus, in this embodiment, the selection of the preview template depends on the entity.

Other parameters may be used to select an appropriate preview template in addition to the type of the web site and/or the entity of the web site. Such additional parameters may include a context application identifier that may be included with the request from the client. This application identifier identifies the context in which the preview will be presented. Such context may be a chat window, a document, a social media post, or the like. The entity may register a different preview template based on each of these contexts. Alternatively, or in addition, the selection may be based on both a type of web site as well as the context in which the web site preview will be presented.

As another example, the selection may be based on a screen size of the client that is to render the web site preview. The screen size may be identified within the request from the client to the preview service. The entity may register a different preview template based on each of multiple screen sizes. Alternatively, or in addition, the selection may be based on both a type of web site as well as the screen size of the client. Thus, the web site entity, the type of the web site, the context in which the preview will be rendered, and the screen size of the client that will render the preview (or various combinations of the above) may be used to select the appropriate preview template.

Accordingly, the principles described herein provide a rich preview experience, where generation of the preview is determined based on data performed at a preview service, and in which the user may interact directly with the preview, rather than having to navigate to the associated web site.

Because the principles described herein are performed in the context of a computing system, some introductory discussion of a computing system will be described with respect to FIG. 10. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 10, in its most basic configuration, a computing system 1000 includes at least one hardware processing unit 1002 and memory 1004. The processing unit 1002 includes a general-purpose processor. Although not required, the processing unit 1002 may also include a field programmable gate array (FPGA), an application specific integrated circuit (ASIC), or any other specialized circuit. In one embodiment, the memory 1004 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 1000 also has thereon multiple structures often referred to as an "executable component". For instance, the memory 1004 of the computing system 1000 is illustrated as including executable component 1006. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 1004 of the computing system 1000. Computing system 1000 may also contain communication channels 1008 that allow the computing system 1000 to communicate with other computing systems over, for example, network 1010.

While not all computing systems require a user interface, in some embodiments, the computing system 1000 includes a user interface system 1012 for use in interfacing with a user. The user interface system 1012 may include output mechanisms 1012A as well as input mechanisms 1012B. The principles described herein are not limited to the precise output mechanisms 1012A or input mechanisms 1012B as such will depend on the nature of the device. However, output mechanisms 1012A might include, for instance, speakers, displays, tactile output, virtual or augmented reality, holograms and so forth. Examples of input mechanisms 1012B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A service computing system that generates a preview of a website, where the preview of the website includes an action control configured to control the website from within the preview of the website, said service computing system comprising:
   one or more processors; and
   one or more computer-readable media having thereon instructions that are executable by the one or more processors to cause the service computing system to:
      receive a website identifier corresponding to a website;
      in response to the received website identifier, access metadata associated with the website, wherein the metadata includes information for an action control, which is associated with the website, the action control, when activated, controls, from within a preview of the website, an action for the website;
      select, using the metadata, a preview template that controls how the action control is displayed relative to other elements in the preview of the website;
      extract the information for the action control and obtain the preview template;

based on the extracted information for the action control and the preview template, construct preview data representing the preview of the website, wherein the preview data includes the information about the action control and is organized based on the preview template, and wherein the preview data is structured to be interpretable by a client computing system to cause the client computing system to render the preview of the website, the preview of the website includes a preview-embedded version of the action control that, when activated, controls the action for the website via the preview-embedded version of the action control.

2. The service computing system of claim 1, wherein, when the preview-embedded version of the action control is selected from within the preview of the website, the action for the website is triggered without a navigation to the website occurring.

3. The service computing system of claim 1, wherein the preview of the website further includes one or more of an image or text.

4. The service computing system of claim 1, wherein the action control is a navigation control such that, when the preview-embedded version of the action control is selected, a navigation action is performed.

5. The service computing system of claim 1, wherein the action control is an input control such that, when the preview-embedded version of the action control is selected, input provided by a user is provided to the website.

6. The service computing system of claim 1, wherein the action control is an output control such that, when the preview-embedded version of the action control is selected, data from the website is populated into the preview-embedded version of the action control.

7. The service computing system of claim 1, wherein the action control is a description control such that, when the preview-embedded version of the action control is selected, description data associated with the website is accessed.

8. The service computing system of claim 1, wherein the action control accesses a service that is outside of a domain of the website.

9. The service computing system of claim 1, wherein the action control is an input control such that, when the preview-embedded version of the action control is selected, input provided by a user is provided to the website, and wherein the input includes one or more of text, a Boolean value, or a selection from a group of items.

10. The service computing system of claim 1, wherein the action control is associated with a configuration defining a type of connection that is facilitated by the action control.

11. A computer-implemented method for generating a preview of a website, where the preview of the website includes an action control configured to control the website from within the preview of the website, the method comprising:
receiving a website identifier corresponding to a website;
in response to the received website identifier, accessing metadata associated with the website, wherein the metadata includes information for an action control, which is associated with the website, the action control, when activated, controls, from within a preview of the website, an action for the website;
selecting, using the metadata, a preview template that controls how the action control is displayed relative to other elements in the preview of the website;
extracting the information for the action control and obtaining the preview template;
based on the extracted information for the action control and the preview template, constructing preview data representing the preview of the website, wherein the preview data includes the information about the action control and is organized based on the preview template, and wherein the preview data is structured to be interpretable by a client computing system to cause the client computing system to render the preview of the website, the preview of the website includes a preview-embedded version of the action control that, when activated, controls the action for the website via the preview-embedded version of the action control.

12. The method of claim 11, wherein, when the preview-embedded version of the action control is selected from within the preview of the website, the action for the website is triggered without a navigation to the website occurring.

13. The method of claim 11, wherein the preview of the website further includes one or more of an image or text.

14. The method of claim 11, wherein the action control is a navigation control such that, when the preview-embedded version of the action control is selected, a navigation action is performed.

15. The method of claim 11, wherein the action control is an input control such that, when the preview-embedded version of the action control is selected, input provided by a user is provided to the website.

16. The method of claim 11, wherein the action control is an output control such that, when the preview-embedded version of the action control is selected, data from the website is populated into the preview-embedded version of the action control.

17. A computer-implemented method for generating a preview of a website, where the preview of the website includes an action control configured to control the website from within the preview of the website, the method comprising:
accessing metadata associated with a website, wherein the metadata includes information about an action control that is usable to control an action associated with the website, wherein the action includes one or more of a first action that controls the website or a second action that triggers a service located outside of a domain of the website;
generating preview data representing a preview of the website, the preview data being structured to be interpreted by a client computing system to cause the client computing system to render the preview of the website, wherein:
the preview data includes the information about the action control such that when the preview of the website is displayed, a preview-embedded version of the action control is also displayed as a part of the preview of the website, and
said action is controllable via the preview-embedded version of the action control; and
causing the generated preview data to be sent to the client computing system.

18. The method of claim 17, wherein the action includes the first action that controls the website.

19. The method of claim 17, wherein the action includes the second action that triggers the service, which is located outside of the domain of the website.

* * * * *